US008864159B2

(12) United States Patent  (10) Patent No.: US 8,864,159 B2
Scolari  (45) Date of Patent: Oct. 21, 2014

(54) BICYCLE FRAME

(71) Applicant: Zike, LLC, Greenville, SC (US)

(72) Inventor: Nathan Scolari, Greenville, SC (US)

(73) Assignee: Zike, LLC, Greenville, SC (US)

( * ) Notice: Subject to any disclaimer, the term of this patent is extended or adjusted under 35 U.S.C. 154(b) by 0 days.

(21) Appl. No.: 13/842,308

(22) Filed: Mar. 15, 2013

(65) Prior Publication Data

US 2014/0265216 A1  Sep. 18, 2014

(51) Int. Cl.
B62K 3/02 (2006.01)
B62K 15/00 (2006.01)
B62K 25/28 (2006.01)

(52) U.S. Cl.
CPC ............ *B62K 15/00* (2013.01); *B62K 15/006* (2013.01); *B62K 25/286* (2013.01)
USPC ........... 280/275; 280/220; 280/278; 280/287; 280/284; 280/288

(58) Field of Classification Search
CPC .. B62K 15/006; B62K 15/008; B62K 15/001; B62K 25/286; B62J 1/06
USPC .................. 280/275, 220, 278, 287, 284, 288
See application file for complete search history.

(56) References Cited

U.S. PATENT DOCUMENTS

| | | | | |
|---|---|---|---|---|
| 4,511,155 A * | 4/1985 | Galloway | ............ | 280/204 |
| 4,909,537 A * | 3/1990 | Tratner | ............ | 280/278 |
| 5,149,119 A | 9/1992 | Hwang | | |
| 5,236,169 A | 8/1993 | Johnsen | | |
| 6,012,709 A * | 1/2000 | Meatto et al. | ............ | 267/36.1 |
| 6,354,618 B1 * | 3/2002 | Liao | ............ | 280/287 |
| 6,425,598 B2 * | 7/2002 | Murayama | ............ | 280/278 |
| 6,685,265 B1 | 2/2004 | Moore, Jr. | | |
| 2003/0132603 A1 * | 7/2003 | Girard | ............ | 280/283 |
| 2003/0146596 A1 * | 8/2003 | Muser | ............ | 280/284 |

FOREIGN PATENT DOCUMENTS

CN  2139909 Y  8/1993
CN  202029970 U  11/2011

OTHER PUBLICATIONS

International Search Report and Written Opinion of the International Searching Authority for PCT/US2014/025956.

* cited by examiner

*Primary Examiner* — Joseph M Rocca
*Assistant Examiner* — Marlon Arce
(74) *Attorney, Agent, or Firm* — McNair Law Firm, P.A.; Douglas W. Kim; Seann P. Lahey

(57) ABSTRACT

A bicycle frame having a first frame section carrying a handle bar assembly and a front wheel assembly; a second frame section carrying a crank unit and a rear wheel assembly; a first primary connecting arm carried by said first frame section being received into a second primary connecting arm carried by said second frame section, wherein said first primary connecting arm is telescopically carried by said second primary connecting arm for extending and retracting said first frame section relative to said second frame section; a mounting plate included in said second frame section extending over said rear wheel assembly; a plate suspension member included in said second frame section connecting said mounting plate to said rear wheel assembly for controlling relative motion between said mounting plate and said rear wheel assembly. A rider platform is carried by said mounting plate for accommodating a rider.

17 Claims, 11 Drawing Sheets

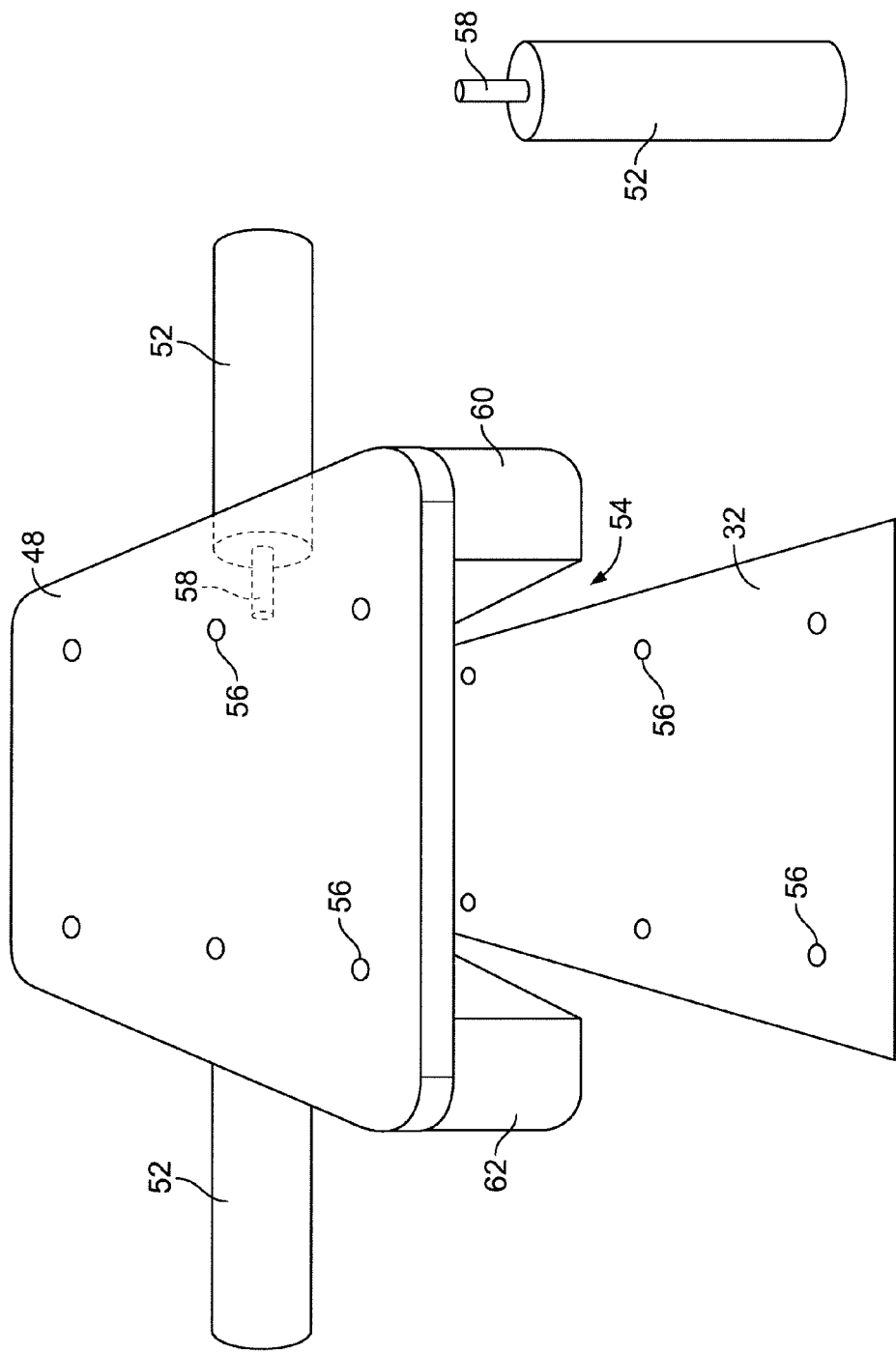

US 8,864,159 B2

BICYCLE FRAME

BACKGROUND OF THE INVENTION

1) Field of the Invention

The present invention relates to non-motorized vehicles, and more particularly, to a frame for a bicycle having adjustable section to vary the wheelbase and a rider platform suspended over the rear wheel to facilitate different riding techniques.

2) Description of Related Art

It has been known in the prior art to attach pegs to a rear portion of a bicycle frame generally adjacent the rear wheel assembly to allow the rider to stand on the pegs, particularly for trick riding. However, a problem arises in that the pegs are mounted to rigid sections of the frame that do not provide any cushioning or shock absorption for the rider when standing on the pegs.

Further, when the rider is positioned over the rear wheel assembly, for example, when standing on the pegs for trick riding, it is advantageous to have a shorter wheel base between the front and rear wheels. However, for speed riding or longer distance riding, a longer wheel base is more advantageous. The prior art, however, does not teach an arrangement for an adjustable frame that allows the rider to shorten or lengthen the wheel base for a desired type of riding style.

Accordingly, it is an object of the present invention to provide a bicycle frame with a suspension system associated with portions of the frame on which a rider sits or stands.

It is a further object of the present invention to provide a bicycle frame that is adjustable to extend or shorten the wheel base to accommodate a desired riding style.

SUMMARY OF THE INVENTION

The above objectives are accomplished according to the present invention by providing a bicycle frame comprising a first frame section carrying a handle bar assembly and a front wheel assembly; a second frame section carrying a crank unit and a rear wheel assembly; a first primary connecting arm carried by the first frame section being received into a second primary connecting arm carried by the second frame section, wherein the first primary connecting arm is telescopically carried by the second primary connecting arm for extending and retracting the first frame section relative to the second frame section; a mounting plate included in the second frame section extending over the rear wheel assembly; and, a plate suspension member included in the second frame section connecting the mounting plate to the rear wheel assembly for controlling relative motion between the mounting plate and the rear wheel assembly.

In a further advantageous embodiment, a frame suspension member is provided interconnecting the first frame section and the second frame section, wherein the frame suspension member controls the telescopic movement between the first primary connecting arm and the second primary connecting arm.

In a further advantageous embodiment, a pivot joint is disposed in the second primary connecting arm allowing for an up and down movement of at least a portion of the second primary connecting arm, wherein the frame suspension member is pivotally carried by the first and second frame section to accommodate the up and down movement of the second primary connecting arm and telescoping movement of the first primary connecting arm.

In a further advantageous embodiment, a first distal end portion of the mounting plate is pivotally connected to a frame arm carrying the mounting plate.

In a further advantageous embodiment, the plate suspension member is defined by at least one leaf spring interconnecting the mounting plate to the rear wheel assembly.

In a further advantageous embodiment, the plate suspension member is defined by at least one selected from the group consisting of a coil spring and shock absorber interconnecting the mounting plate to the rear wheel assembly.

In a further advantageous embodiment, a rider platform is releasably carried by the mounting plate for accommodating a rider.

In a further advantageous embodiment, the rider platform includes a plate receiving channel complementary to the mounting plate for receiving the mounting plate, wherein the rider platform is secured to the mounting plate through an arrangement of predefined securing points allowing the rider platform to be selectively positioned at one of a plurality of predefined positions along the mounting plate.

In a further advantageous embodiment, the rider platform includes at least one selected from the group consisting of a seat assembly and a footrest.

In a further advantageous embodiment, the rider platform includes at least one footrest defined by a peg extending laterally outward from the rider platform on which a rider can stand.

In a further advantageous embodiment, the rider platform includes an elongated slot extending along each of a first side portion and a second side portion disposed generally opposite each other; a first peg is carried in the elongated slot on the first side portion, and a second peg is carried in the elongated slot on the second side portion, wherein the first and second pegs are repositionable at any point along the length of the elongated slots.

In a further advantageous embodiment, an extension bar is provided having a first distal end pivotally mounted to the rider platform, and a second distal end carrying the peg so that the peg is carried lower than the rider platform.

In a further advantageous embodiment, the seat assembly carried by the rider platform includes a seat post carrying a seat at a first distal end, a fender carried along the length of the seat post, and a second distal end of the seat post being pivotally mounted to the rider platform; wherein the seat assembly is operable between a raised position in which the seat post extends generally upward from the rider platform for accommodating a rider, and a lowered position in which the seat post extends generally parallel with the rider platform over the rear wheel assembly so that the fender is disposed over a rear wheel.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIG. 8 shows an exploded view of a mounting plate and rider platform according to the present invention;

FIG. 9 shows a footrest peg according to the present invention;

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention. Likewise, other objects, features, benefits and advantages of the present invention will be apparent from this summary and certain embodiments described below.

DETAILED DESCRIPTION OF A PREFERRED EMBODIMENT

With reference to the drawings, the invention will now be described in more detail.

Figure 1:
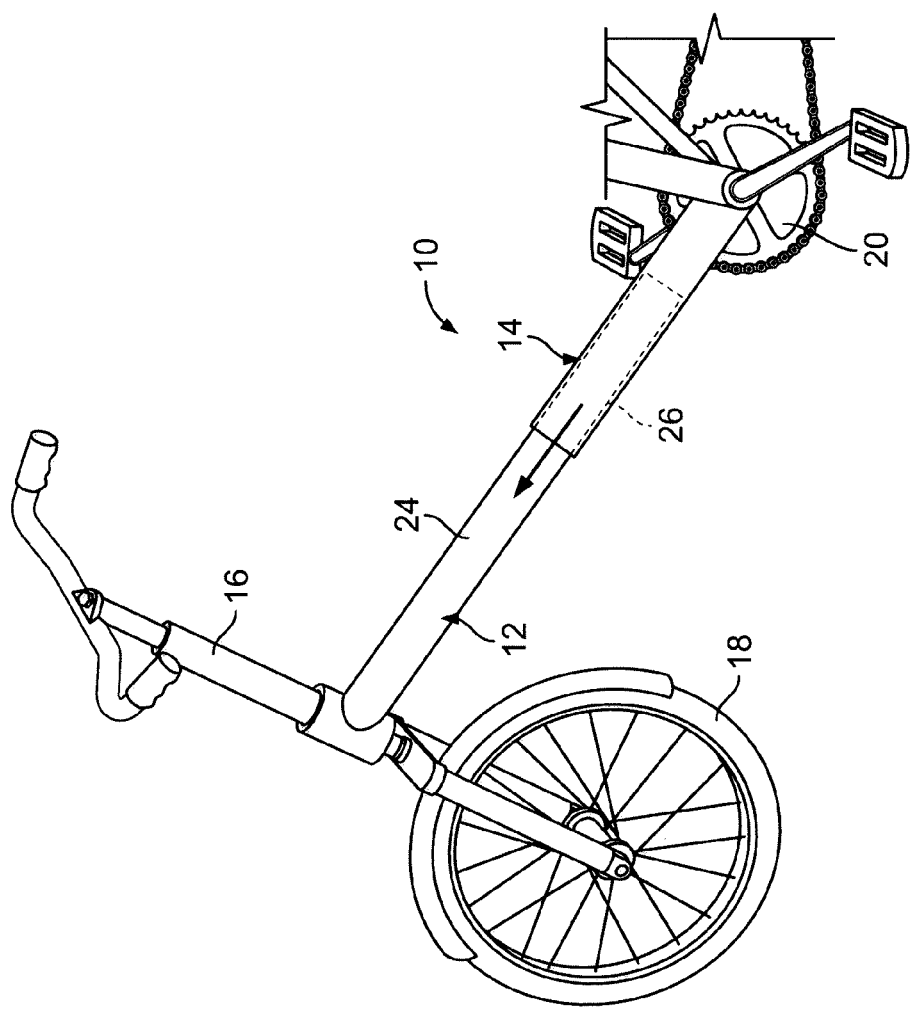
FIG. 1 shows a side view of a portion of a bicycle frame according to the present invention.
Figure 2:
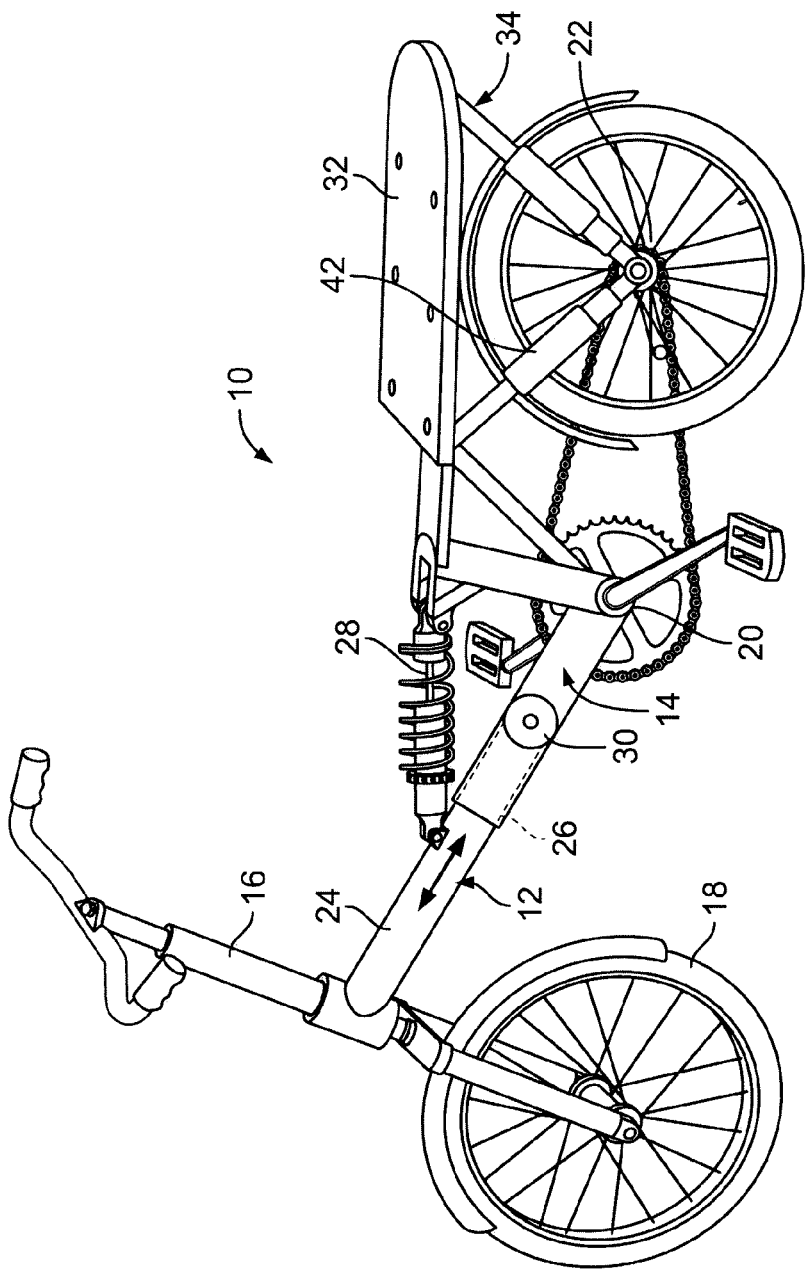
FIG. 2 shows a side view of a portion of a further embodiment of a bicycle frame according to the present invention.

Referring to FIGS. 1 and 2, a portion of a bicycle frame, designated generally as 10, is shown having a first frame section, designated generally as 12. This first frame section 12 carries the handle bar assembly 16 operatively connected to a front wheel assembly 18 for steering the bicycle as commonly known in the art. A second frame section, designated generally as 14, is provided carrying a crank unit 20 and a rear wheel assembly 22.

To provide an adjustable wheel base for the rider, in the illustrated embodiment, a first primary connecting arm 24 is carried by first frame section 12 that is received into a second primary connecting arm 26 carried by second frame section 14. Alternatively, second primary connecting arm 26 may be received into first primary connecting arm 24. In either arrangement, first primary connecting arm 24 is telescopically carried by second primary connecting arm 26 for extending and retracting first frame section 12 relative to second frame section 14. The first and second primary connecting arms can engage each other using any of a number of means such as a detent lock, bolt, pins, and the like which can be quickly operated to extend or retract first primary connecting arm 24 into second primary connecting arm 26. Accordingly, the rider can adjust the wheelbase between the front and rear wheels for a given riding style.

Referring to FIG. 2, in the illustrated embodiment, a frame suspension member 28 may be provided interconnecting first frame section 12 and second frame section 14, which helps controls the telescopic movement between the first primary connecting arm and the second primary connecting arm. In this arrangement, frame suspension member 28 can be utilized to prevent separation of first primary connecting arm 24 from second primary connecting arm 26 without the need for other engaging members locking the arms 24, 26 together. In this embodiment, impacts received by first frame section 12 can be dampened and absorbed as first frame section recoils toward second frame section 14 as controlled by frame suspension member 28. In the illustrated embodiment, frame suspension member 28 is a coilover unit. A coilover unit generally consists of a shock absorber (strut) with a coil spring encircling it as is well known in the art. Typically a pneumatic or hydraulic shock absorber would be selected for use in conjunction with this application.

Additionally, in the illustrated embodiment, a pivot joint 30 may be disposed in second primary connecting arm 26 allowing for an up and down movement of at least a portion of second primary connecting arm 26. In this arrangement, frame suspension member 28 is pivotally carried by first and second frame section 12, 14 to accommodate the up and down movement of second primary connecting arm 26 and telescoping movement of first primary connecting arm 24. Accordingly, first frame section 12 can pivot up and back toward second frame section 14 when recoiling to absorb impacts or when pulled back by the rider, the movement of which being controlled by the stiffness of frame suspension member 28.

Figure 3:
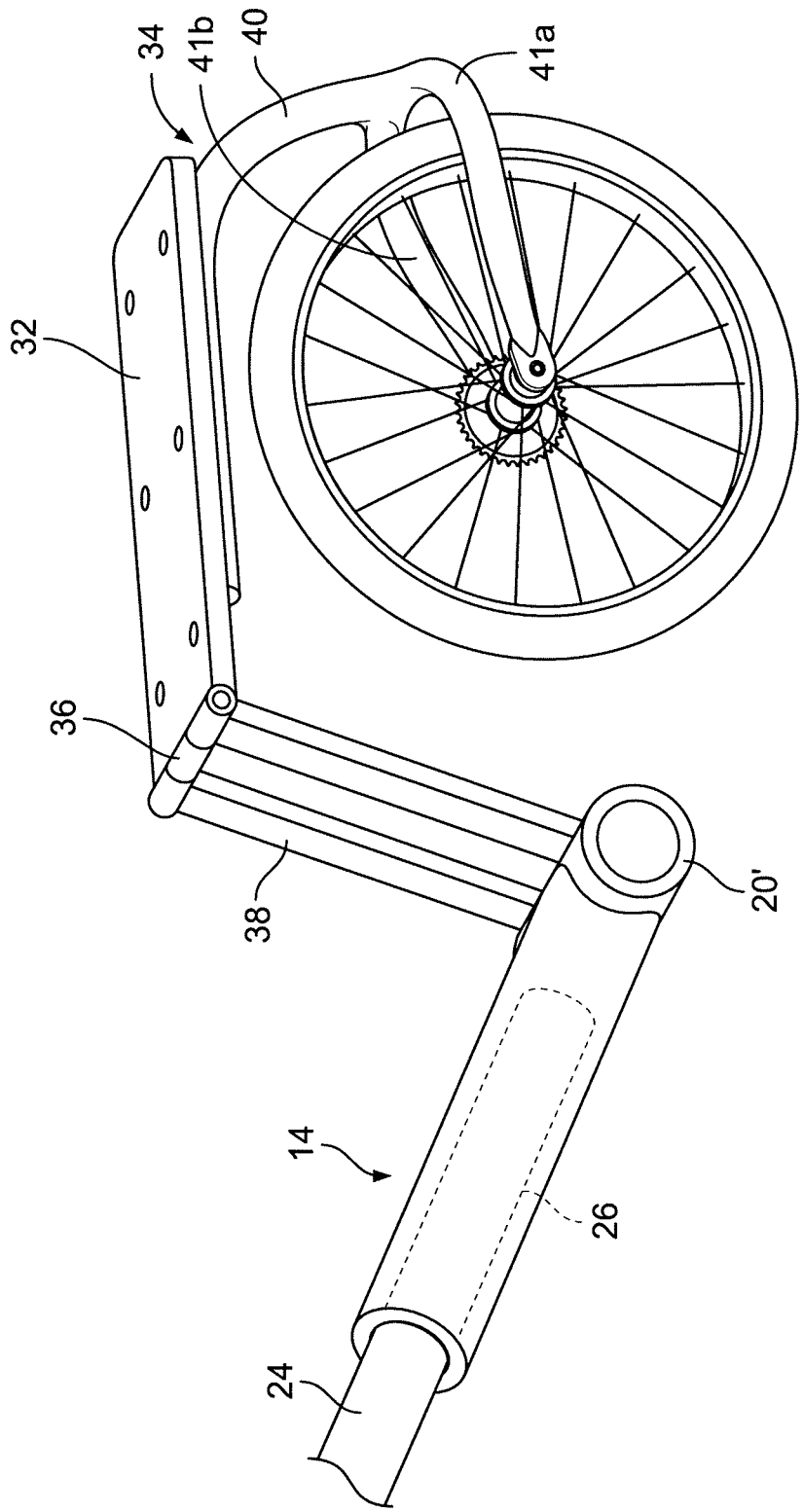
FIG. 3 shows a detailed perspective view of a second frame section having a plate suspension member connecting to a rear wheel assembly according to the present invention.

Referring to FIGS. 2 and 3, in the illustrated embodiment, a mounting plate 32 is included in second frame section 14 extending over rear wheel assembly 22, which as detailed herein below, is adapted to received a rider platform to accommodate a rider. To support mounting plate 32, a plate suspension member, designated generally as 34, is provided defining a portion of second frame section 14. In the illustrated embodiment, plate suspension member 34 connects mounting plate 32 to rear wheel assembly 22 for controlling relative motion between mounting plate 32 and rear wheel assembly 22. Preferably, rear wheel assembly 22 is completely carried by plate suspension member 34, however, other rigid frame arms may also be utilized to reinforce rear wheel assembly 22 for a desired application, such as off-road riding. Thus, by suspending mounting platform 32 with plate suspension member 34, a shock absorbing platform is provided for the rider on which to operate the bicycle.

Referring to FIG. 3, in the illustrated embodiment, a first distal end portion 36 of mounting plate 32 is pivotally connected to a frame arm 38 carrying mounting plate 32. This provided greater movement of mounting plate 32 for shock absorption through plate suspension member 34. An opening 20' is defined in the frame for receiving the crank unit.

Referring to FIG. 3, in one illustrated embodiment, plate suspension member 34 is defined by at least one leaf spring 40 interconnecting mounting plate 32 to rear wheel assembly 22.

Figure 5:
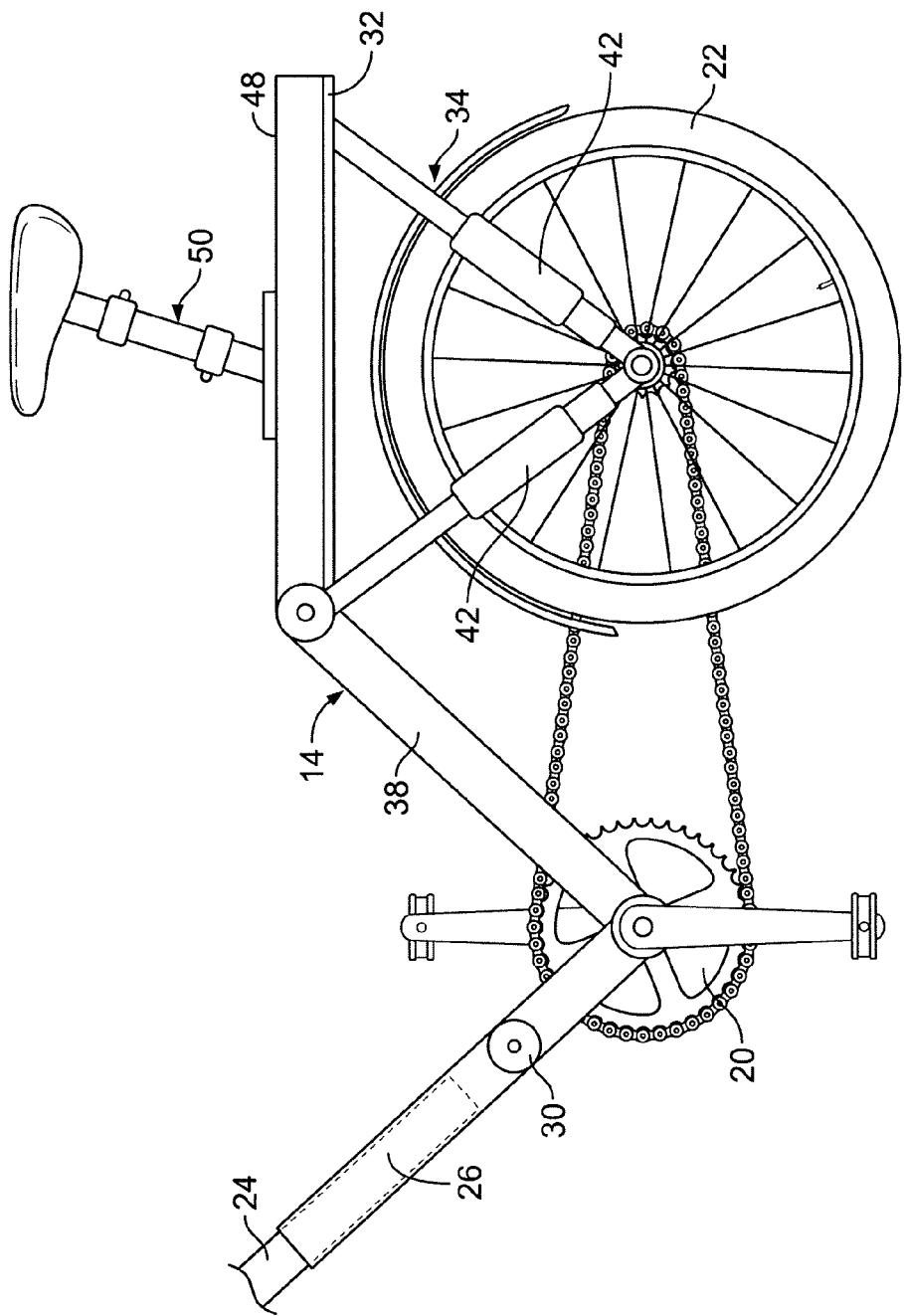
FIG. 5 shows a side view of an alternative plate suspension member according to the present invention.
Figure 7:
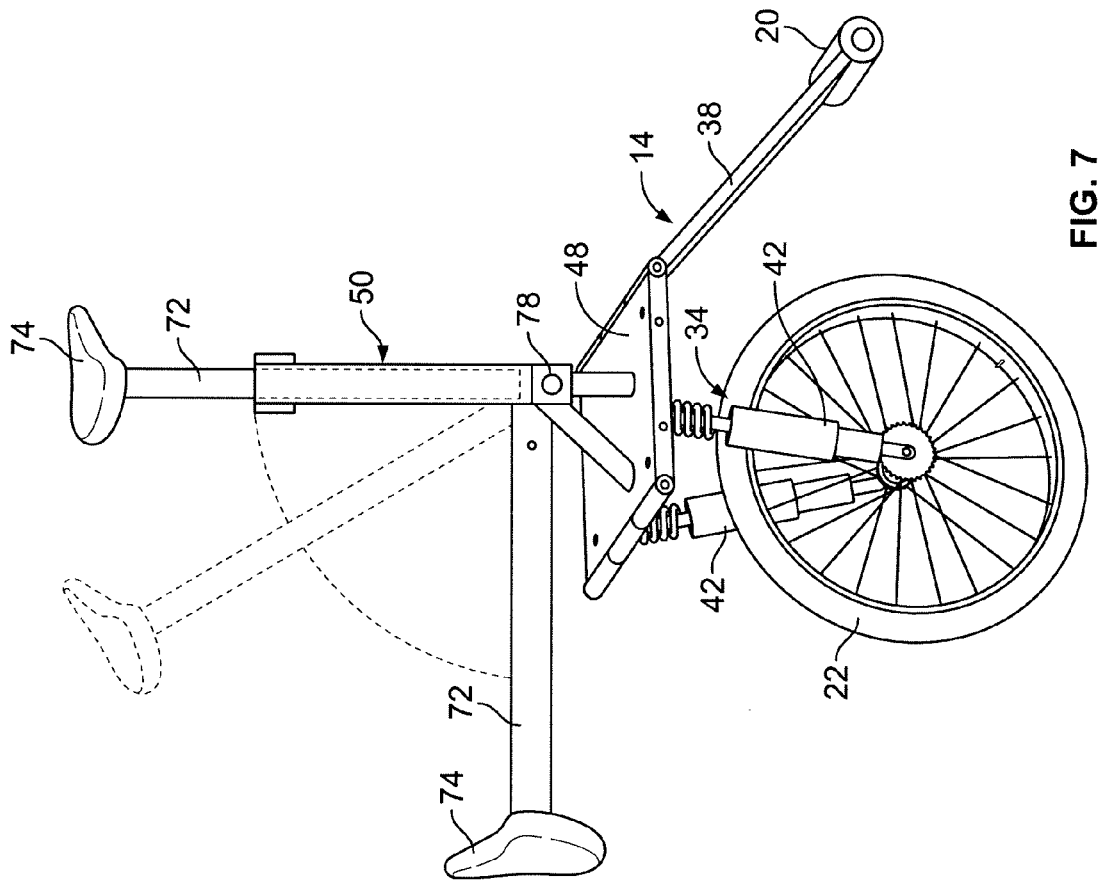
FIG. 7 shows a perspective view of the second frame section with a seat assembly pivotally mounted to a rider platform according to the present invention.
Figure 6:
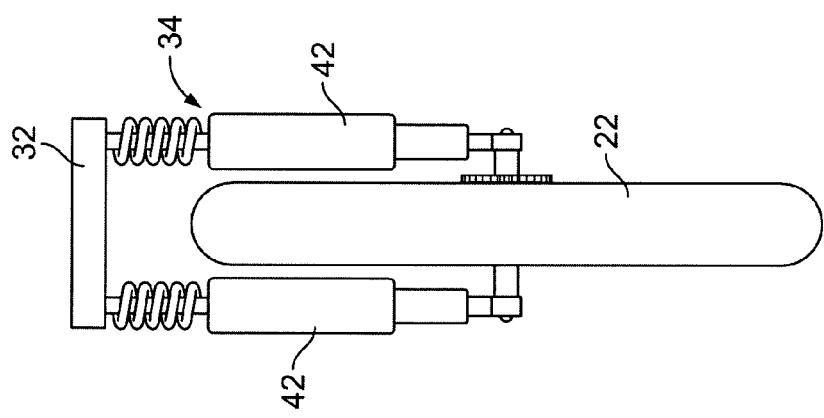
FIG. 6 shows an end view of the plate suspension member of FIG. 5 according to the present invention.

Referring to FIGS. 2, and 5-7, plate suspension member 34 is defined by at least one selected from the group consisting of a coil spring and shock absorber interconnecting mounting plate 32 rear wheel assembly 22. Preferably, plate suspension member 34 is a coilover unit 42. A coilover unit generally consists of a shock absorber (strut) with a coil spring encircling it as is well known in the art. Typically a pneumatic or hydraulic shock absorber would be selected for use in conjunction with this application. As shown in FIGS. 2 and 5, a pair of coilover units 42 can be provided on at least one side of rear wheel assembly 22 for connecting with mounting plate 32. As shown in FIGS. 6 and 7, at least one coilover unit 42 is provided on each side of rear wheel assembly 22 for connecting with mounting plate 32.

Figure 4:
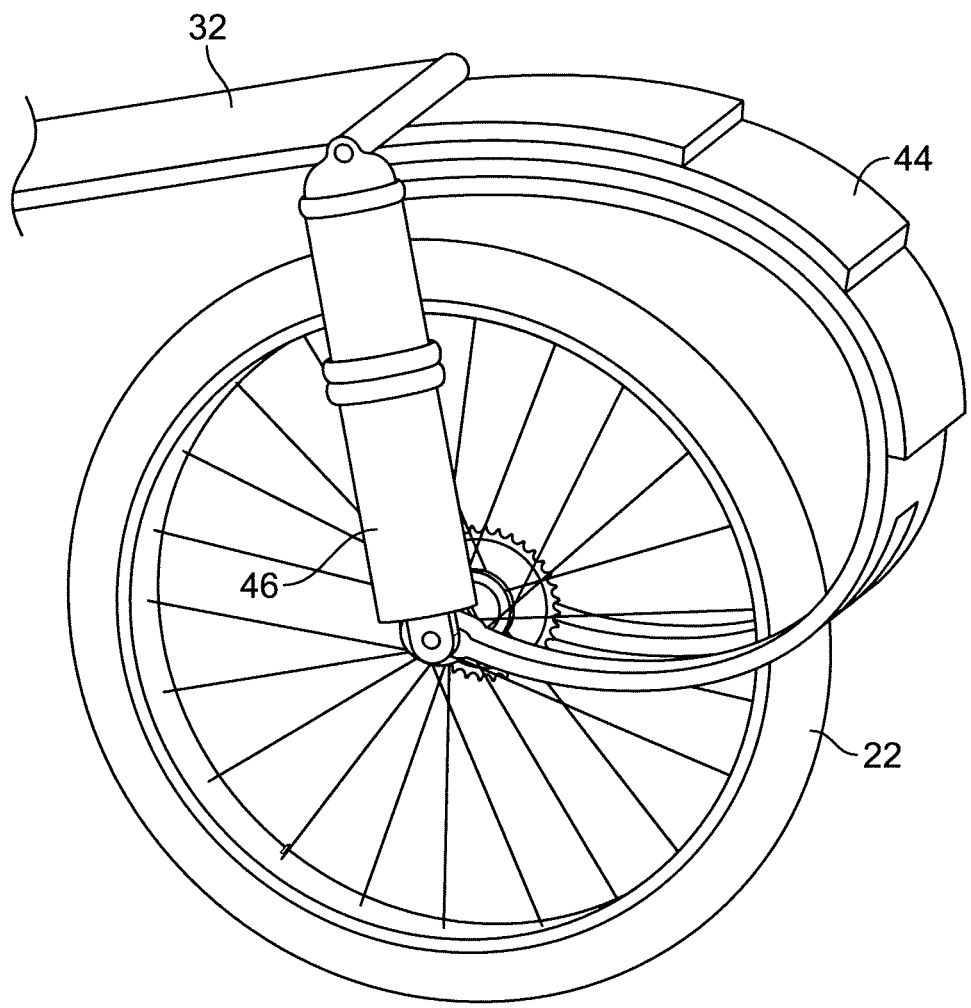
FIG. 4 shows a detailed perspective view of an alternative plate suspension member according to the present invention.

Referring to FIG. 4, a further alternative embodiment is illustrated in which plate suspension member 34 includes both a multi-leaf leaf spring 44 and a shock absorber 46 interconnecting mounting plate 32 to rear wheel assembly 22.

Figure 10:
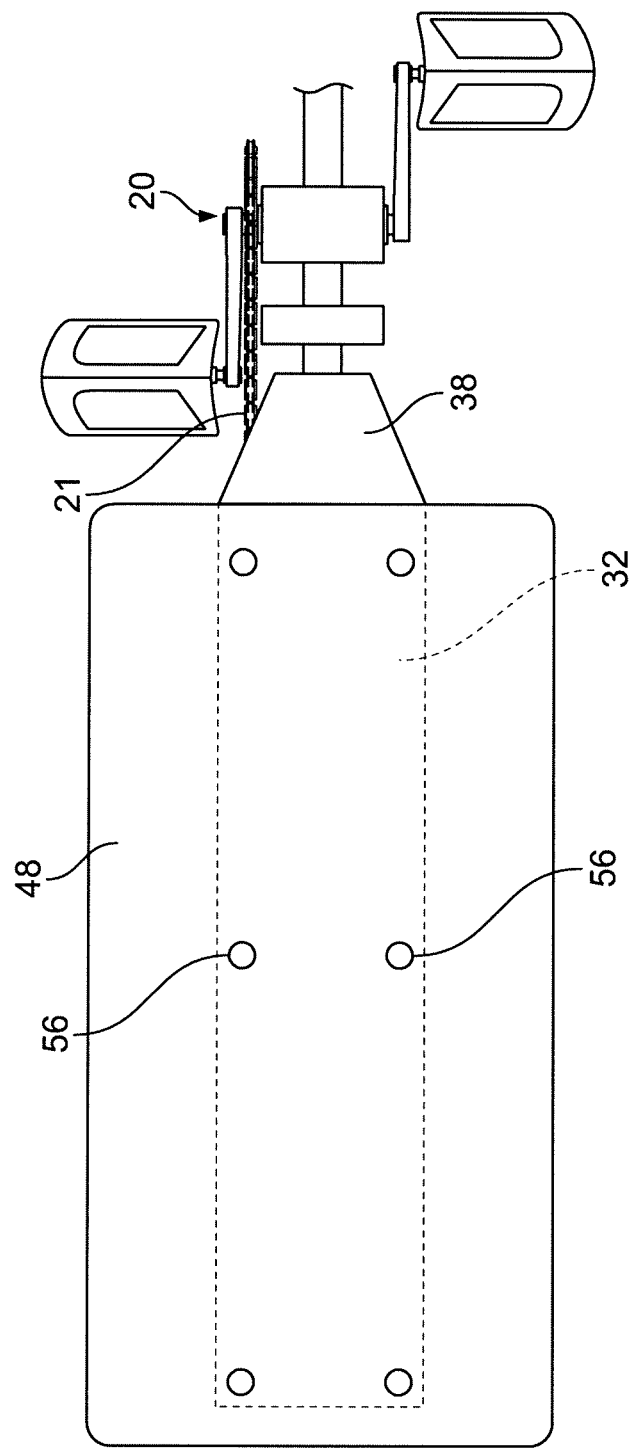
FIG. 10 shows a top view of the rider platform on the mounting plate according to the present invention.

Referring to FIG. 8, a rider platform 48 is releasably carried by mounting plate 32 for accommodating a rider. Preferably, as shown in FIG. 8, rider platform 48 includes a plate receiving channel 54 complementary to the shape of mounting plate 32 for receiving mounting plate 32. Referring to FIGS. 8 and 10, rider platform 48 can be secured to mounting plate 32 through an arrangement of predefined securing points 56 included in both mounting plate 32 and rider platform 48 allowing rider platform 48 to be selectively positioned at one of a plurality of predefined positions along mounting plate 32. In one embodiment, screws, clips, pins or the like can be used to releasably secure rider platform 48 to mounting platform 32.

Accordingly, a variety of rider platforms can be attached to mounting plate 32 to meet a given riding style or technique. For example, rider platform 48 can be a simple wide platform on which the rider can stand for trick riding and the like. Referring to FIGS. 5 and 7, in one illustrated embodiment, rider platform 48 can include a seat assembly, designated generally as 50, on which the rider can sit when operating the bicycle. In a further embodiment, referring to FIGS. 8-9 and 11-14, rider platform 48 can include footrests on which the rider can stand. In the illustrated embodiment, the footrests are defined by a peg 52 extending laterally outward from a side of rider platform 48. Thus, by providing rider platform 48 with one of pegs 52 and/or seat assembly 50 carried on mounting plate 32, a suspension is provided to cushion the rider during use.

Referring to FIGS. 8 and 9, in the illustrated arrangement, peg 52 includes a prong 58 that is received into a complementary opening in side portions 60 and 62 on opposing sides of rider platform 48. In this arrangement, pegs 52 are fixed at a single position on rider platform 48.

Figure 11:
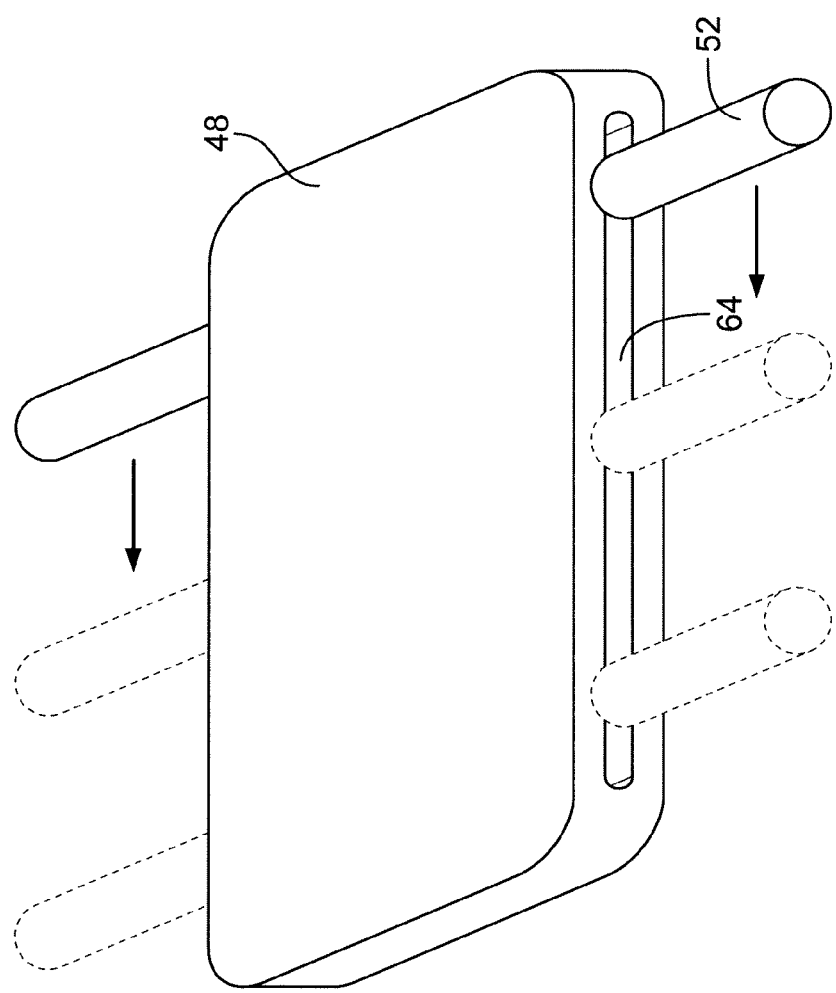
FIG. 11 shows a perspective view of the rider platform with a first peg arrangement according to the present invention.
Figure 13:
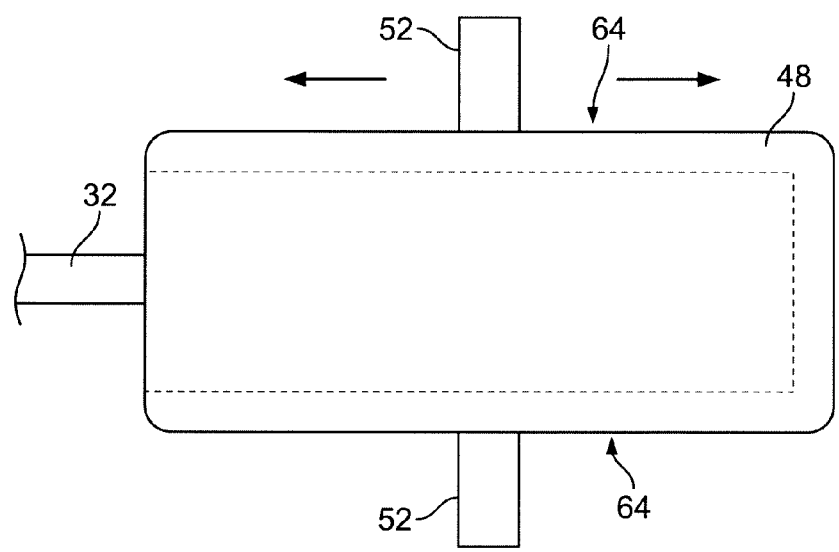
FIG. 13 shows a top view of FIG. 12.

Referring to FIGS. 11 and 13, in an alternative embodiment, rider platform 48 includes an elongated slot 64 extending along each of first side portion 60 and second side portion 62 disposed generally opposite each other. A peg 52 is carried in each elongated slot 64 on first and second side portions 60, 62. In a preferred embodiment, each of pegs 52 would include a threaded prong 58 (FIG. 9) with a T-nut (not pictured) carried on the end of prong 58 in elongated slot 64. Thus, by twisting pegs 52, the t-nut can be tightened against the walls defining elongated slot 64, or loosened, to allow pegs 52 to be infinitely repositionable along elongated slot 64. Other methods can be employed to secure pegs 52 in slot 64 in a repositionable manner as well known to those skilled in the art.

Figure 12:
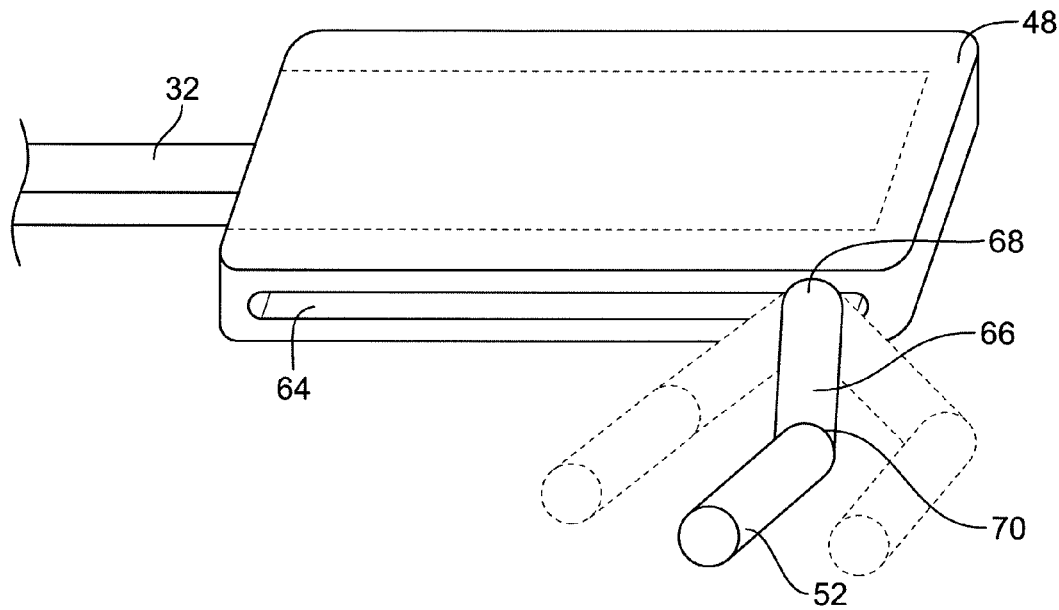
FIG. 12 shows a perspective view of the rider platform with a second peg arrangement according to the present invention.
Figure 14:
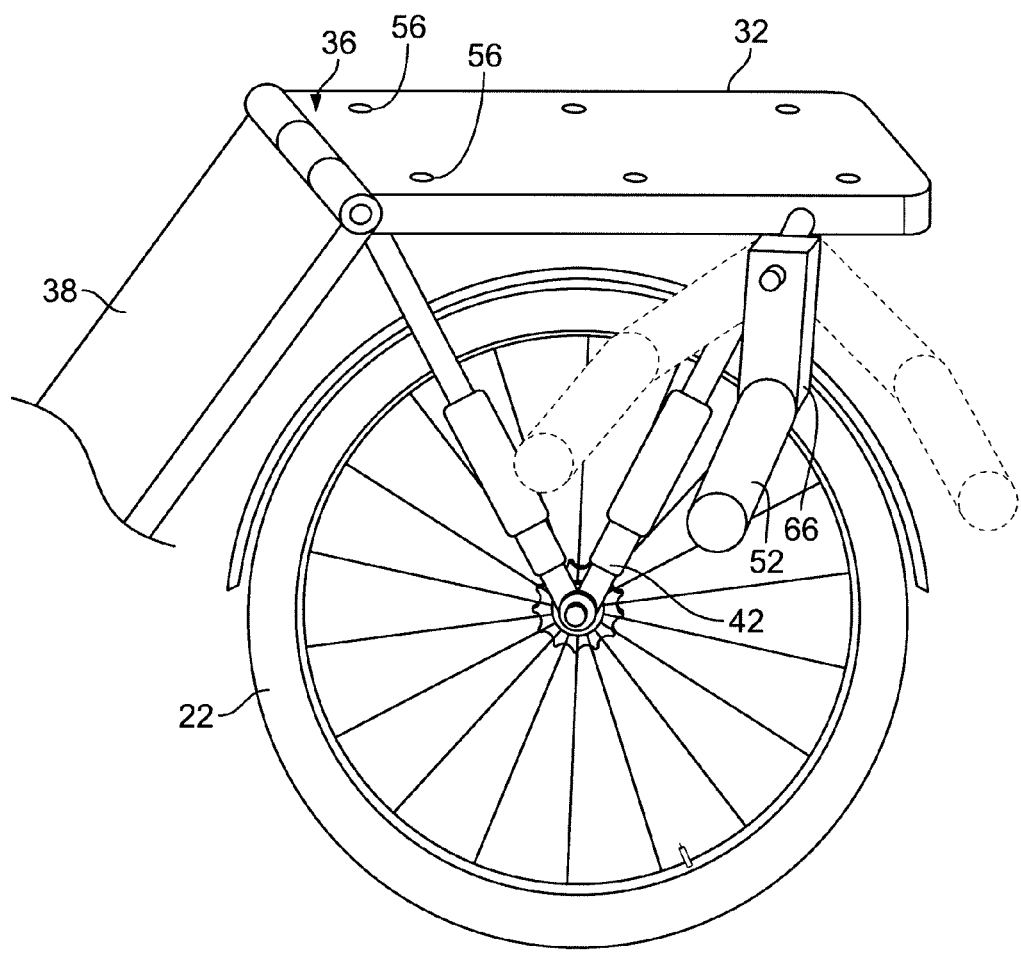
FIG. 14 shows a side view of the mounting plate with a footrest peg pivotally carried thereon according to the present invention.

Referring to FIG. 12, in an alternative arrangement, an extension bar 66 is provided having a first distal end 68 pivotally mounted to rider platform 48, and preferably elongated slot 64, and a second distal end 70 carrying peg 52 so that the peg is carried lower than rider platform 48. The length of extension bar 66 can be varied depending on a riders preference or to suit a particular riding technique. In the illustrated embodiment of FIG. 12, extension bar 66 can be free-swinging, or lockable in a series of predefined orientations to provide a stable footrest for the rider. Referring to FIG. 14, in a further alternative embodiment, extension bar 66 is pivotally mounted directly to mounting plate 32 and allowed to free-swing below mounting plate 32 to facilitate trick riding, or is lockable in a series of predefined orientations to provide a stable footrest for the rider.

Referring to FIG. 7, in the illustrated embodiment, seat assembly 50 carried by on rider platform 48 includes a seat post 72 carrying a seat 74 at a first distal end, and a fender 76 carried along the length of seat post 72, and a second distal end 78 of seat post 72 being pivotally mounted to rider platform 48. Accordingly, seat assembly 50 is operable between a raised position in which the seat post extends generally upward from rider platform 48 for accommodating a rider, and a lowered position in which the seat post extends generally parallel with rider platform 48 over rear wheel assembly 22 so that fender 76 is disposed over a rear wheel to help block water spray and dirt from hitting the rider.

While a preferred embodiment of the invention has been described using specific terms, such description is for illustrative purposes only, and it is to be understood that changes and variations may be made without departing from the spirit or scope of the following claims.

What is claimed is:

1. A bicycle frame comprising:
    a first frame section carrying a handle bar assembly and a front wheel assembly;
    a second frame section carrying a crank unit and a rear wheel assembly;
    a first primary connecting arm carried by said first frame section being received into a second primary connecting arm carried by said second frame section, wherein said first primary connecting arm is telescopically carried by said second primary connecting arm for extending and retracting said first frame section relative to said second frame section;
    a mounting plate included in said second frame section extending over said rear wheel assembly;
    a plate suspension member included in said second frame section connecting said mounting plate to said rear wheel assembly for controlling relative motion between said mounting plate and said rear wheel assembly; and
    a pivot joint disposed in said second primary connecting arm allowing for an up and down movement of at least a portion of said second primary connecting arm, wherein said frame suspension member is pivotally carried by said first and second frame section to accommodate the up and down movement of said second primary connecting arm and telescoping movement of said first primary connecting arm.

2. The frame of claim 1 including a frame suspension member interconnecting said first frame section and said second frame section, wherein said frame suspension member controls the telescopic movement between said first primary connecting arm and said second primary connecting arm.

3. The frame of claim 1 wherein a first distal end portion of said mounting plate is pivotally connected to a frame arm carrying said mounting plate.

4. The frame of claim 1 wherein said plate suspension member is defined by at least one leaf spring interconnecting said mounting plate to said rear wheel assembly.

5. The frame of claim 1 wherein said plate suspension member is defined by at least one selected from the group consisting of a coil spring and shock absorber interconnecting said mounting plate to said rear wheel assembly.

6. The frame of claim 1 including a rider platform releasably carried by said mounting plate for accommodating a rider.

7. The frame of claim 6 wherein said rider platform includes a plate receiving channel complementary to said mounting plate for receiving said mounting plate, wherein said rider platform is secured to said mounting plate through an arrangement of predefined securing points allowing said rider platform to be selectively positioned at one of a plurality of predefined positions along said mounting plate.

8. The frame of claim 6 wherein said rider platform includes at least one selected from the group consisting of a seat assembly and a footrest.

9. A bicycle frame comprising:
a first frame section carrying a handle bar assembly and a front wheel assembly;
a second frame section carrying a crank unit and a rear wheel assembly;
a mounting plate included in said second frame section extending over said rear wheel assembly;
a plate suspension member included in said second frame section connecting said mounting plate to said rear wheel assembly for controlling relative motion between said mounting plate and said rear wheel assembly; and
a first distal end portion of said mounting plate is pivotally connected to a frame arm carrying said mounting plate.

10. The frame of claim 9 wherein said plate suspension member is defined by at least one leaf spring interconnecting said mounting plate to said rear wheel assembly.

11. The frame of claim 9 wherein said plate suspension member is defined by at least one selected from the group consisting of a coil spring and shock absorber interconnecting said mounting plate to said rear wheel assembly.

12. The frame of claim 9 including a rider platform releasably carried by said mounting plate; wherein said rider platform includes a plate receiving channel complementary to said mounting plate for receiving said mounting plate, and wherein said rider platform is secured to said mounting plate through an arrangement of predefined securing points allowing said rider platform to be selectively positioned at one of a plurality of predefined positions along said mounting plate, and wherein said rider platform includes at least one selected from the group consisting of a seat assembly and a footrest for accommodating a rider.

13. A bicycle frame comprising:
a first frame section carrying a handle bar assembly and a front wheel assembly;
a second frame section carrying a crank unit and a rear wheel assembly;
a mounting plate included in said second frame section extending over said rear wheel assembly, wherein a first distal end portion of said mounting plate is pivotally connected to a frame arm carrying said mounting plate;
a plate suspension member included in said second frame section connecting said mounting plate to said rear wheel assembly for controlling relative motion between said mounting plate and said rear wheel assembly;
a rider platform carried by said mounting plate for accommodating a rider; and
wherein said rider platform includes at least one footrest defined by a peg extending laterally outward from said rider platform on which a rider can stand.

14. The frame of claim 13 wherein said rider platform includes an elongated slot extending along each of a first side portion and a second side portion disposed generally opposite of each other;
a first peg is carried in said elongated slot on said first side portion, and a second peg is carried in said elongated slot on said second side portion, wherein said first and second pegs are repositionable at any point along the length of said elongated slots.

15. The frame of claim 13 including an extension bar having a first distal end pivotally mounted to said rider platform and a second distal end carrying said peg so that said peg is carried lower than said rider platform.

16. The frame of claim 13 including a seat assembly carried by said rider platform, wherein said seat assembly includes a seat post carrying a seat at a first distal end, a fender carried along the length of said seat post, and a second distal end of said seat post being pivotally mounted to said rider platform; wherein said seat assembly is operable between a raised position in which said seat post extends generally upward from said rider platform for accommodating a rider, and a lowered position in which said seat post extends generally parallel with said rider platform over said rear wheel assembly so that said fender is disposed over a rear wheel.

17. A bicycle frame comprising:
a first frame section carrying a handle bar assembly and a front wheel assembly;
a second frame section carrying a crank unit and a rear wheel assembly;
a first primary connecting arm carried by said first frame section being received into a second primary connecting arm carried by said second frame section, wherein said first primary connecting arm is telescopically carried by said second primary connecting arm for extending and retracting said first frame section relative to said second frame section;
a mounting plate included in said second frame section extending over said rear wheel assembly;
a plate suspension member included in said second frame section connecting said mounting plate to said rear wheel assembly for controlling relative motion between said mounting plate and said rear wheel assembly; and
a first distal end portion of said mounting plate is pivotally connected to a frame arm carrying said mounting plate.

* * * * *